March 30, 1948. M. E. CUSHMAN 2,438,542
PROPELLER BLADE, BEARING AND SEAL ASSEMBLY
Filed Sept. 7, 1944 4 Sheets-Sheet 1

INVENTOR
MAURICE E. CUSHMAN
BY
ATTORNEY

March 30, 1948.    M. E. CUSHMAN    2,438,542

PROPELLER BLADE, BEARING AND SEAL ASSEMBLY

Filed Sept. 7, 1944    4 Sheets-Sheet 2

INVENTOR
MAURICE E. CUSHMAN
BY
ATTORNEY

March 30, 1948.  M. E. CUSHMAN  2,438,542
PROPELLER BLADE, BEARING AND SEAL ASSEMBLY
Filed Sept. 7, 1944  4 Sheets-Sheet 3

INVENTOR
MAURICE E. CUSHMAN
BY
ATTORNEY

March 30, 1948. M. E. CUSHMAN 2,438,542
PROPELLER BLADE, BEARING AND SEAL ASSEMBLY
Filed Sept. 7, 1944   4 Sheets-Sheet 4

INVENTOR
MAURICE E. CUSHMAN
ATTORNEY

Patented Mar. 30, 1948

2,438,542

UNITED STATES PATENT OFFICE 2,438,542

PROPELLER BLADE, BEARING, AND SEAL ASSEMBLY

Maurice E. Cushman, Verona, N. J., assignor to Curtiss-Wright Corporation, a corporation of Delaware Application September 7, 1944, Serial No. 553,089

2 Claims. (Cl. 170—162)

My invention relates to a propeller blade, bearing and seal assembly.

More specifically, my invention resides in an improved blade-journalling arrangement whereby the weight of the propeller assembly is materially reduced and the efficiency thereof enhanced.

In known controllable pitch propeller assemblies, the length of each blade-receiving socket is such that a stack of anti-friction bearing elements, including a blade retaining nut, is accommodated therein. Moreover, the length of the blade shank is such that, after a blade has been placed in its socket, a portion of the blade shank extends beyond the end of the socket often to a region at or adjacent the front edge of the engine cowling in order to provide shank space on which to assemble and move the anti-friction elements and retaining nut lengthwise therealong for blade installation purposes as will be understood.

It is also known that it is desirable for the engine to be cooled by the air stream set up by rotation of the propeller blades. However, since the airfoil section of each blade is usually so located that it operates adjacent or beyond the edge of the engine cowling, little of the propeller air stream is available for engine-cooling purposes. Moreover, the exposed shank of each propeller blade when entering the slip stream, during flight, causes an undesirable drag. To obviate these undesirable conditions, it has been customary heretofore to affix a cup about the exposed shank portions whereby the airfoil section of each blade is lengthened to extend inwardly toward the hub and to a region in close proximity to the end of each blade-receiving socket. Thus, an airfoil contour is imparted to the exposed shank portion of each blade for operation within the engine zone whereby shank drag is eliminated and more efficient cooling of the engine is obtained.

Accordingly, it is an object of my invention to provide an improved propeller blade journalling arrangement in which a propeller hub having relatively shorter blade-receiving sockets and blades with a relatively shorter shank portion are utilized, whereby the airfoil section of each blade is positioned closer to the hub to reduce shank drag and the need for blade cuffs.

A further object of the invention is to provide an improved blade - journalling arrangement wherein the number of anti-friction bearing elements for each blade is reduced to a single main bearing of the angular roller type.

Another object of the invention is to provide a main anti-friction bearing assembly formed from separable sections whereby the association of said bearing assembly with a propeller blade and a hub therefor is facilitated.

For an understanding of the invention and for an illustration thereof, reference is to be had to the accompanying drawings, in which.

Figure 1:
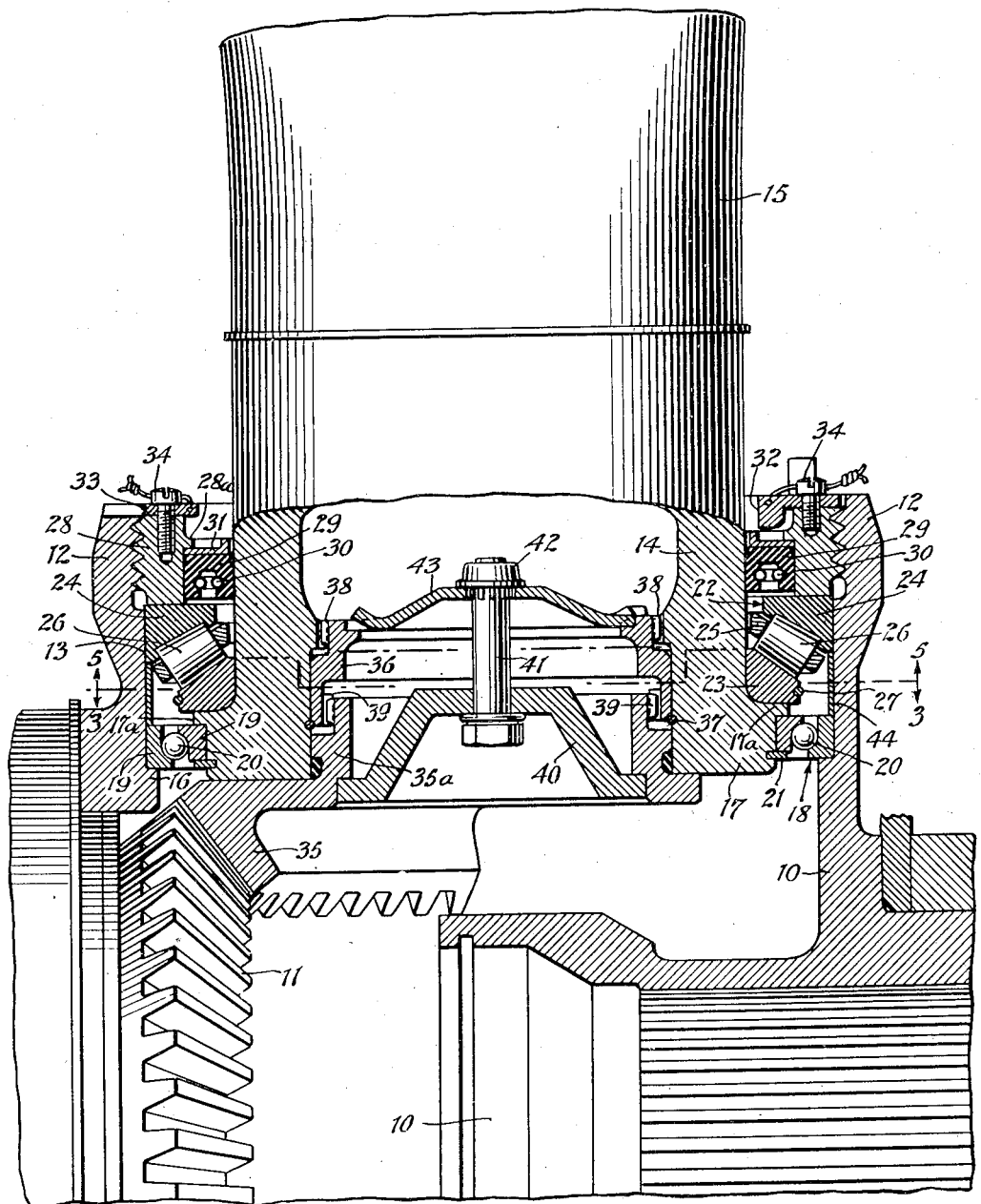
Figure 1 is a sectional view illustrating the shank of a propeller blade journalled in a blade-carrying hub.
Figure 2:
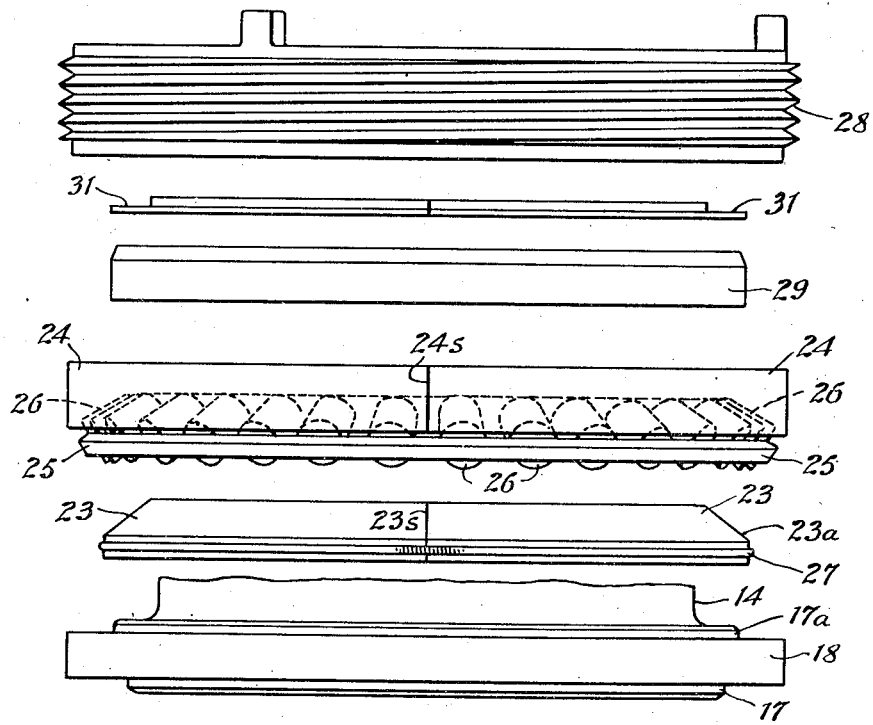
Fig. 2 is an elevational view illustrating the sequence in which blade-journalling parts are positioned about the root of a propeller blade shank.

Referring to the drawings and to Fig. 1 in particular, I have shown a fragmentary section of a propeller hub 10 including a power gear 11 and one of a plurality of blade-receiving barrels or sockets 12. The blade-receiving socket 12 extends radially from the hub 10 a distance which is usually dependent upon the type of blade-journalling arrangement employed and, obviously, the length of the associated propeller blade shank is dependent upon the radial length of the hub 10. In accordance with the invention, the propeller hub 10 is similar to such structures known heretofore with the exception that the length of the blade-receiving socket 12 is shorter than would be the case, as hereinafter more fully explained, if the thrust bearing was formed from a stack of ball bearings.

The blade-receiving socket 12 is provided with the usual counterbore 13 for the rotatable reception of the assembled bearing and shank 14 of a blade 15, said counterbore 13 including a shoulder 16 to limit the depth to which the shank of the blade may be inserted in its socket 12 as will be understood.

The blade shank 14 comprises an external annular flange 17 formed integral with the root end of the blade which is suitably undercut to provide a flanged seat 17a for a bearing 18 comprising inner and outer ball races 19 which support the anti-friction spherical members 20. The bearing 18 is retained against the shoulder or seat 17a by a snap ring 21 occupying an annular groove provided therefor in said undercut portion of the flange 17 as clearly shown in Fig. 1.

In accordance with the invention, a thrust bearing 22 is disposed around the blade shank 14 and in engagement with the outer surface of the aforesaid flange 17. The bearing 22, in the example shown in Figs. 1-5 inclusive, comprises a bearing cone or inner race 23, a bearing cup or outer race 24 and an intermediate frusto-conical retaining cage 25 having a plurality of rollers 26 associated therewith, said retaining cage 25 being positioned between the cone 23 and the cup 24. As hereinafter described and in accordance with the form of the invention shown in Figs. 1-5 inclusive, the aforesaid cone 23, cup 24 and cage 25 are formed from substantially duplicate sections, the sections of the cone 23, preferably although not necessarily, being held in assembled relation on the blade shank 14 by a yieldable endless belt 27 formed, for example, from coiled spring wire.

Associated in threaded relation with the socket 12, at the top thereof, is a blade-retaining ring or nut 28 which engages the cup 24 to positively hold the parts of bearing 22 in assembled relation. A resilient U-shaped seal 29 is maintained in sealing relation with respect to the outer surface of the blade shank 14 and the interior surface of the nut 28 by a pair of flexible garter rings 30. A two-piece metal ring 31 having a short upstanding flange is positioned on top of and held in engagement with the seal 29 by a flange 28a formed on the aforesaid nut 28. The ring 31 reinforces the seal 29 to thereby prevent escape of a lubricant in response to centrifugal force generated during rotation of the propeller. As known in the art, lugs 32 utilizable for blade-balancing purposes together with a key 33 are secured to the upper face of the nut 28 by suitable screws 34, the lugs 32 and key 33 having short arcuate configuration.

As shown in Fig. 1, a gear segment 35 meshes with the hereinbefore described power gear 11 which is actuated by a suitable power unit, not shown, when it becomes desirable to transmit power to the propeller blades in order to change the pitch thereof. The gear segment 35 may be associated with the blade shank 14 in any suitable manner for rotatable movement therewith as a unit. As herein shown, although not necessarily, the gear segment 35 is associated with said blade shank 14 as described in pending application Serial No. 519,064, filed January 19, 1944.

Accordingly, a sleeve 36 is disposed within the bore of the blade shank 14 and is held in position by a snap ring 37, said sleeve 36 being splined to the blade shank by a series of circumferential splines as indicated at 38. The gear segment 35 comprises a hub 35a which, by a circumferential series of splines 39, is connected to the aforesaid sleeve 36. A plug 40 cooperates with the gear segment hub 35a to maintain the same in the position illustrated and said plug 40, in turn, is secured in the position shown in Fig. 1 by a bolt 41 which is threaded to a nut 42 carried by a plate washer 43 disposed on a flange of said sleeve 36.

In accordance with the invention, the bearing cone 23 comprises a raceway 23a which is engaged by the rollers 26 carried by the cage 25. The bearing cup 24 comprises a complementary raceway 24a which, likewise, is engaged by said rollers 26. The cup 24 further comprises concentric shoulders 24b disposed at the respective opposite sides of the raceway 24a, these shoulders being utilizable as hereinafter described.

Figure 7:
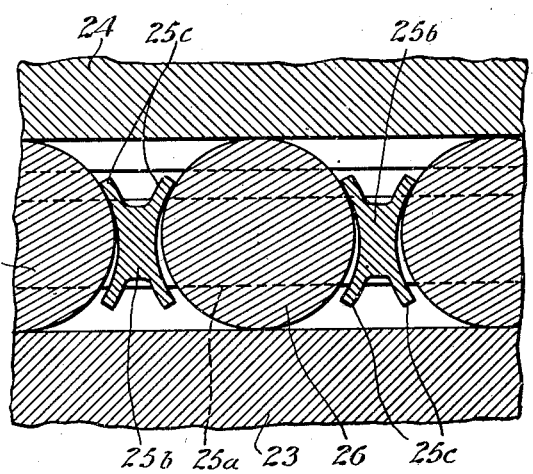
Fig. 7 is an enlarged sectional view taken on the line 7—7 of Fig. 6 looking in the direction of the arrows.
Figure 8:
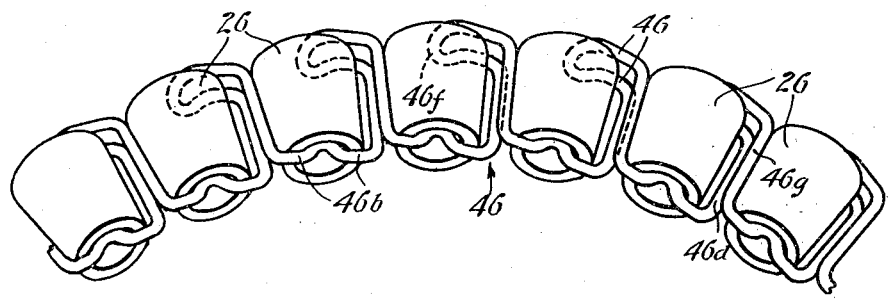
Fig. 8 is a plan view showing a modified form of roller-retaining retainer or holder.
Figure 11:
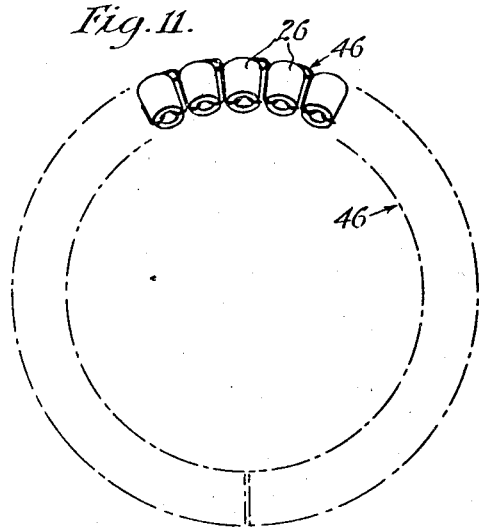
Fig. 11 is a plan view showing the one-piece roller-retaining holder.
Figure 9:
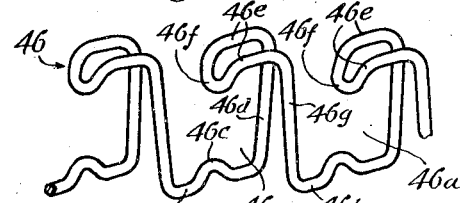
Fig. 9 is a perspective view showing a part of the holder illustrated in Fig. 8.

Each section of the cage 25 comprises concentric annular members 25a connected transversely by integral ribs 25b. Opposite respective sides of each rib has a pair of members 25c projecting therefrom. As shown in Fig. 7, a pair of adjacent ribs 25b together with the four members 25c at the facing surfaces of said ribs last named form a pocket in which a roller 26 is mounted and retained for free rotatable movement. It will be understood that the other rollers 26 are mounted in similar manner and it will also be understood that other equivalent arrangements, in lieu of the arrangement described, may be utilized for mounting said rollers 26.

Figure 4:
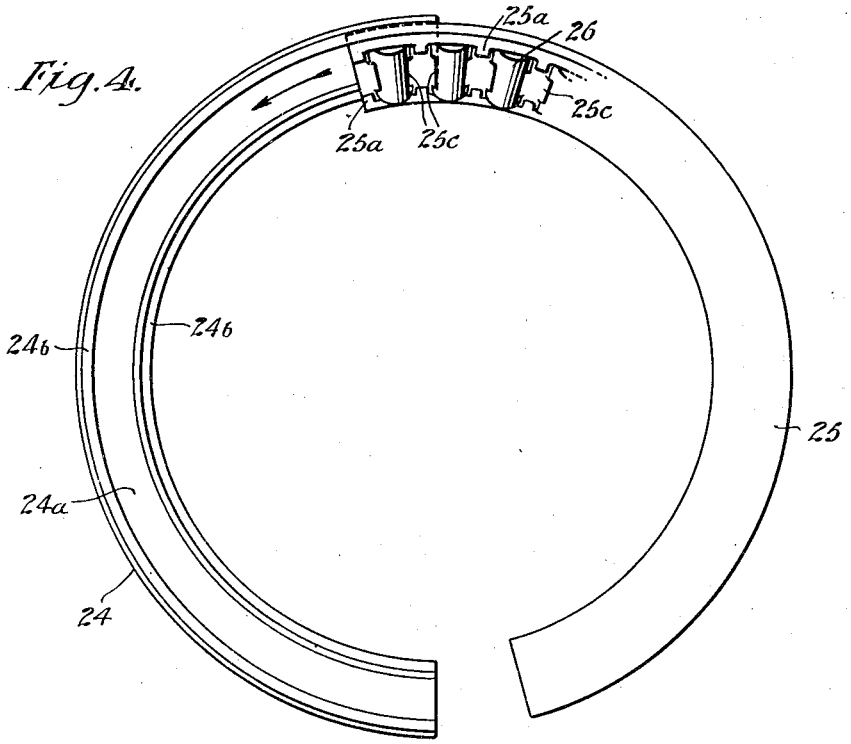
Fig. 4 is a plan view illustrating a detailed feature of the invention.
Figure 5:
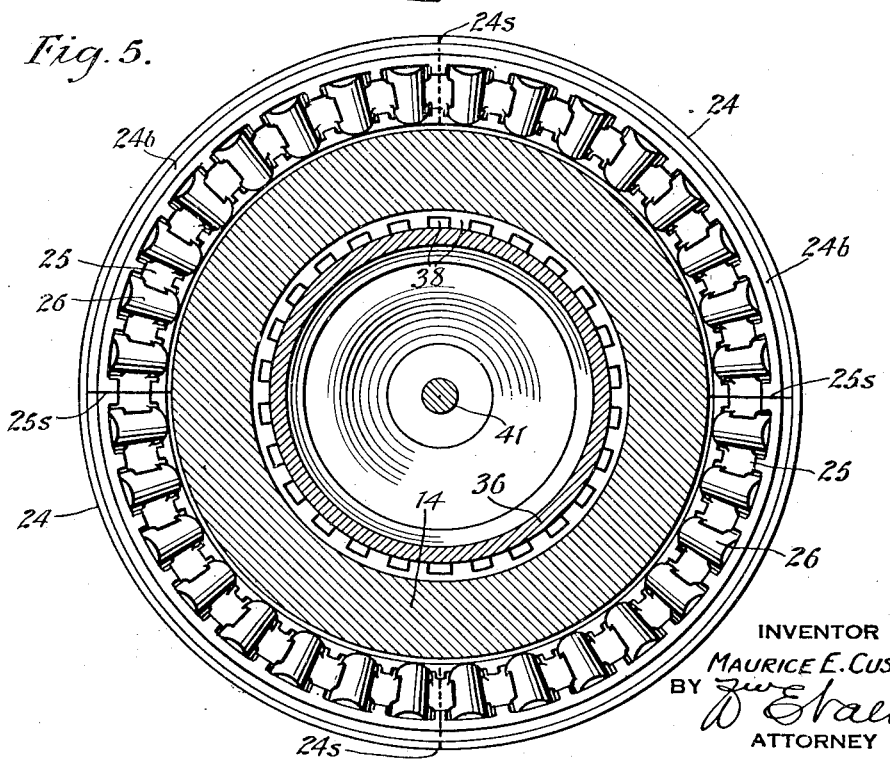
Fig. 5 is a transverse sectional view taken on the line 5—5 of Fig. 1 looking in the direction of the arrows.
Figure 6:
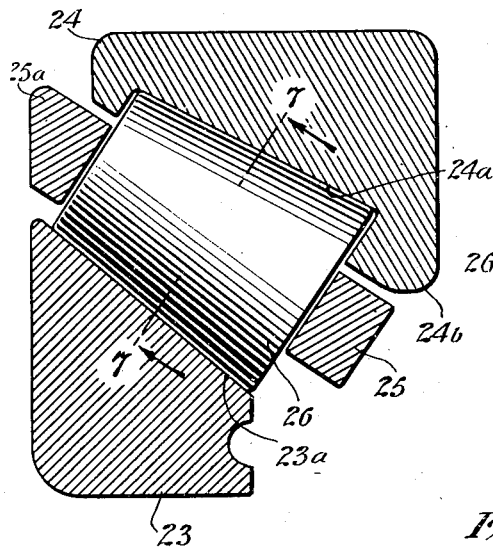
Fig. 6 is an enlarged sectional view, partly in elevation, showing my novel thrust bearing.

Prior to the time that the cup 24 and cage 25 are assembled as shown in Fig. 1, it is necessary to associate the respective sections of the cage 25 with the sections of the cup 24. When this is to be done, a cage section and a cup section may be held generally as indicated in Fig. 4 with the cup raceway 24a facing upwardly and with the cage section so positioned that the rollers 26 occupy generally the same inclined relation as does the raceway 24a. Thereupon, the cage section and the cup section are moved relative to each other to cause the first roller 26 to enter the raceway 24a between the shoulders 24b. Continued relative movement as indicated by the arrow, Fig. 4, causes the hemi-circular cage section to be superimposed on the hemi-circular cup section with all of the rollers 26 on the raceway 24a. When this has been done, the rollers 26 coact with the shoulder 24b at the right, Fig. 6, in such manner that it is impossible to move the cage and cup sections axially with respect to each other although they are capable of free relative movement in a transverse plane, i. e., when the rollers 26 roll on the raceway 24a. It will be understood, then, that the rollers 26 connect the cage and cup sections together in non-separable relation provided that said cage and cup sections are maintained in superimposed relation as described above or substantially so. It shall be understood, however, that the invention is not to be thus limited because, if desired, the ribs and rollers may be of such character that the rollers 26 do not connect the cage and cup sections together as described above.

Assuming that the blade 15 is disposed in a horizontal position on a suitable support with its shank 14 in an overhanging position, the blade-retaining nut 28, without the lugs 32 and key 33, is passed over and well beyond the flange 17 at the root end of the shank 14. Thereupon, the resilient seal 29 is stretched and passed over the blade shank 14 to a position adjacent the nut 28. At this time, the two-piece metal ring 31 is preferably positioned about the shank 14 between the nut 28 and the seal 29 whereupon the nut 28 is moved toward and over said seal 29. In so doing, the nut flange 28a engages the ring 31 with the result that the nut 28, the ring 31 and the seal 29 assume approximately the proper relative positions with respect to each other.

Figure 3:
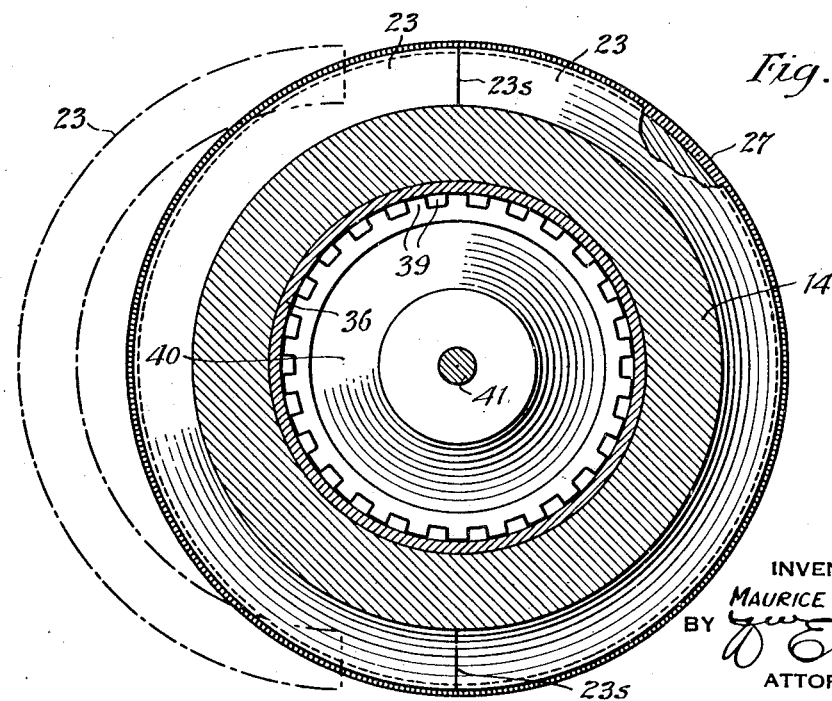
Fig. 3 is a transverse sectional view taken on the line 3—3 of Fig. 1 looking in the direction of the arrows.

After completion of the foregoing, the duplicate sections of the cone 23 are positioned on the upper surface of the flange 17 of the propeller blade in the manner indicated in Fig. 3 and the belt 27 engaged therewith to positively hold these in operative position wherein they engage each other at the sets of diametrically opposite surfaces 23s.

Thereupon, the two assemblies each comprising a cage section and a cup section, which have been superimposed in non-separable relation as described above, are disposed around the blade shank 14 with the rollers 26 in engagement with the raceway 23a of the cone 23.

When this has been done, the cage sections engage each other at the sets of diametrically opposite surfaces 25s and the cup sections engage each other at the sets of diametrically opposite surfaces 24s. Further, at this time, the sets of surfaces 25s are aligned with the respective sets of surfaces 24s. As the next step in the assembling operation, relative movement is effected between the cage sections on the one hand and the cup sections on the other hand to "break" the aforesaid alinement or, in other words, to cause the sets of surfaces 25s to be non-alined with regard to the respective sets of surfaces 24s. As a result, the rollers 26 of each cage section are caused to coact with both of the cup sections so that the two cage sections, the two cup sections and the rollers 26 become an assembly which cannot be disassembled while the sets of surfaces 25s and 24s remain non-alined as described above. This is highly desirable because facilitating the general assembling operation.

After completion of the foregoing, the bearing 18, previously described, is positioned against the shoulder 17a and retained thereon by the snap ring 21.

In accordance with the invention, the above described assembling operation may be performed by reason of the fact (1) that the external diameter of the flange 17 including its shoulder 17a is slightly less than the internal diameter of the nut 28 and (2) that the seal 29 is readily stretchable so that it may be passed over said flange 17.

Assuming that the gear segment 35 has been associated with the blade shank 14, for example, in the manner hereinbefore described, the blade 15, with the bearing, sealing and retaining parts positioned thereon as described above, is inserted into the socket 12 of the hub 10 and, in so doing, the gear teeth of the gear segment 35 come in proper meshing relation with the gear teeth of the power gear 11. Thereupon, the nut 28 is engaged with the threads in the outer end of the socket 12 and threaded into the position shown in Fig. 1. In so doing, the seal 29 and the ring 31 are caused to assume their proper respective positions as illustrated.

Referring to Fig. 1, a suitable spacing sleeve 44 of selected height, prior to the time that the bearing 18 is attached in position, may, if desired, be disposed around the bearing 22 inwardly of the cup 24 thereof. Thereafter, the bearing 18 is assembled as stated and, when the nut 28 is threaded to its final position, the sleeve 44 limits the preloading of the bearing 18 to a desired degree, such preloading being caused by the force produced by threading of the nut 28, this force being transmitted through the main bearing 22, the flange 17a and thence to said bearing 18.

After the blade 15 has been assembled in the socket 12 in the manner described above, the lugs 32 and key 33 are secured to the upper surface of the retaining nut 28 in accordance with conventional locking and balancing procedure.

With the form of the invention hereinbefore described, the rollers 26 are mounted in a retaining cage 25 which, as stated, is formed with duplicate sections. It shall be understood, however, that the invention is not to be thus limited.

Thus, referring to Figs. 7–11 inclusive, the rollers 26 may be mounted in a one-piece flexible retainer 46 formed from a single length of wire shaped to form passages 46a in which the respective rollers 26 are mounted for free rotatable movement. As illustrated, the retainer 46 is formed from a desired number of duplicate shapes, each of which, Fig. 9, comprises an inner section 46b having a mid-crimp 46c, a vertical section 46d, an outer looped section 46e having a tip 46f inwardly directed toward and disposed substantially opposite the aforesaid crimp 46c, and a second vertical section 46g disposed substantially parallel with the vertical section 46d but displaced transversely therefrom as required by the looped section 46e.

Figure 10:
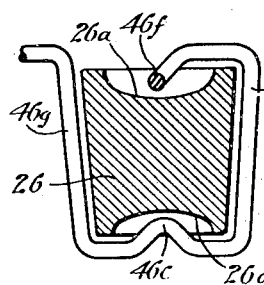
Fig. 10 is a sectional view showing a part of the holder illustrated in Fig. 8.

As illustrated in Fig. 10, each roller 26 comprises depressions 26a axially located at the respective ends thereof. In order to assemble a roller 26 in a holder passage 46a, the tip 46f of that passage is bent outwardly to permit insertion of the roller into said passage 46a. Thereupon, the tip 46f is released and seats in the outer roller depression 26a, the crimp 46c seating in the inner roller depression 26a. In this manner, the rollers 26 are mounted for free rotatable movement in the respective holder passages 46a.

As stated, the retainer 46 is flexible and it should be formed from resilient wire capable of taking and retaining a set configuration. It should be given such set configuration that it inherently assumes substantially the normal position which it will occupy when disposed between the cone 23 and the cup 24.

When the retainer 46 is to be assembled with the cup 24, one of the sections of the latter is held generally as shown in Fig. 4 whereupon one-half of the retainer 46 and its rollers 26 are associated with said cup section in generally the same manner as described with respect to a section of the cup 24 and a section of the cage 25. Thereupon, the other cup section is held in operative relation with respect to the first named cup section and relative rotary movement is effected between the two cup sections and the retainer 46 until the assembling operation is complete with all of the rollers 26 in engagement with the cup raceway 24a. At this time, with the abutting ends of the retainer 46 in alinement with one set of engaging surfaces 24s of the cup 24, the assembly is "opened" by moving said last named surfaces 24s from each other (while the other set of surfaces 24s remain in close relation to each other) to such extent that the "open" assembly is readily placeable around the propeller shank and then closed with the rollers 26 in engagement with the cone raceway 23a. The assembly may be "opened" in the manner described above by reason of the fact that the cup is formed from two sections and, further, because the flexibility of the retainer 46 permits the two cup sections to be moved as described above.

After completion of the described operation and, provided that the ends of the retainer 46 are moved into non-alinement with respect to both sets of engaging surfaces 24s of the cup 24, the two cup sections, the retainer 46 and the rollers 26 constitute an assembly wherein said rollers 26 positively secure said cup sections and the retainer 46 together for rotatable movement only with respect to each other.

It is a feature of the invention that the internal diameter of the roller-supporting means (whether the duplicate-section cage 25 or the retainer 46) is less than the external diameter of the propeller blade flange 17. Either type of roller-supporting means, as hereinbefore described, may readily be associated with the blade shank. This, obviously, can not be done unless the roller-supporting means is formed from plural sections or, if from one piece, unless it is flexible.

When the propeller hub rotates, the load is transmitted from the integral flange 17 of the propeller blade directly to the thrust bearing 22. This is highly desirable and overcomes an objection to a prior art construction wherein the thrust load, before reaching the main bearing, is transmitted through a gear segment corresponding with the gear segment 35 described herein. The provision of the integral flange 17 is advantageous, then, and, by using the duplicate bearing sections and the duplicate cage sections in one case or the duplicate bearing sections and the flexible retainer 46 in another case, I am able to utilize said flange even though the internal diameters of said bearing sections and the retainer 46 when assembled are less than the external diameter of said flange 17.

The advantages of my invention are numerous and of importance. As described, the bearing 22 comprises a single row of the rollers 26 and these are capable of withstanding a thrust load which, if the anti-friction members were spheres, would require two or more rows of the latter unless an impractical size were utilized. The roller bearing of my invention has less weight, then, than does a spherical bearing which would take the same load as the roller bearing.

In addition, the cost of the roller bearing of my invention is substantially less than is the cost of a comparable bearing of the spherical type. The assembly and maintenance operations, with my novel roller bearing, are relatively simple, and such operations may be performed by persons having little mechanical skill or training.

It will be obvious that the utilization of a single row of roller bearings permits the use of a socket 12 for the blade shank 14 which is shorter than would be the case if a stack of spherical bearings were employed. Without increase in the diameter of the propeller, then, a longer length of aerodynamic blade section is obtained. This is desirable in various ways among which is the advantage obtained of utilizing an inboard airfoil section of the propeller blade for directing cooling air toward the airplane engine.

Although the rollers 26 herein illustrated are tapered, it shall be understood that the invention is not to be thus limited. As well, if desired, the rollers may be truly cylindrical, barrel shaped or of other configuration as desired.

It has hereinbefore been stated that the raceway-forming sections of the cone 23 engage each other at the respective sets of surfaces 23s, that the separable sections of the cage 25 engage each other at the respective sets of surfaces 25s and that the raceway-forming sections of the cup 24 engage each other at the respective sets of surfaces 24s. These sets of surfaces on the cone, the cage and the cup, respectively, are positioned diametrically opposite each other and all of said surfaces 23s, 24s and 25s are perpendicular to a plane disposed at right angles to the longitudinal axis of the bearing 22, this plane, in the appended claims, being termed "a plane extending transversely of the main bearing." It shall be understood that the sections of the cone, cage and cup may be so constructed that the respective sets of surfaces 23s, 24s and 25s defining the zones of engagement slant or are angularly related to said plane otherwise than at right angles as illustrated. It shall also be understood that the sections of the cone, the cage and the cup need not be true half-sections as illustrated.

By reference to Fig. 1, it will be noted that, as regards the bearing 22, the cone 23 engages the upper surface of the shank flange 17 and the adjacent surface of the propeller blade shank 14. The remaining parts of said bearing 22 do not engage the adjacent surfaces of the blade shank 14. Thus, the cage 25 together with its rollers 26 are spaced from the exterior shank surface and the same is also true as regards the cup 24.

The described bearing arrangement for the integral flange is especially adapted for use in a specific art as described. Except, however, as set forth in the appended claims, it shall be understood that the invention is not to be limited to the propeller blade art.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, an integral one-piece propeller hub having a socket, said socket comprising a cylindrical wall and including a shoulder at its inner end, a blade shank centered in said socket, the shank having an integral primary flange thereon and a secondary flange extending outwardly from said primary flange, a counterthrust anti-friction bearing having its outer race engaged with said socket wall and with said socket shoulder and having its inner race embracing said primary flange and engaging said secondary flange to limit inward movement of said shank in said socket; a pair of substantially semi-circular complementary races embracing said shank and engaging said primary flange, a pair of semi-circular complementary races fitted to said socket wall outboard of said flange, rollers between said pairs of races to sustain outward forces on said blade; annular retaining means, slidable over said shank flange prior to assembly of said races, engaging said hub socket and that race pair engaged with the socket wall to retain the blade in said socket through said races and rollers; annular resilient sealing means between said annular retaining means and said blade shank; a blade pitch control element within said socket and engaged with the butt end of said blade shank, and means for positioning and securing said control element to said shank.

2. In combination, an integral one-piece propeller hub having a socket, said socket comprising a cylindrical wall and including a shoulder at its inner end, a blade shank centered in said socket, the shank having an integral primary flange thereon and a secondary flange extending outwardly from said primary flange, a counterthrust anti-friction bearing having its outer race engaged with said socket wall and with said socket shoulder and having its inner race embracing said primary flange and engaging said secondary flange to limit inward movement of said shank in said socket; a pair of substantially semi-circular complementary races embracing said shank and engaging said primary flange, a pair of semi-circular complementary races fitted to said socket wall outboard of said flange, rollers between said pairs of races to sustain outward forces on said blade; annular retaining means, slidable over said shank flange prior to assembly of said races, engaging said hub socket and that race pair engaged with the socket wall to retain the blade in said socket through said races and rollers; annular resilient sealing means between said annular retaining means and said blade shank; a blade pitch control element within said socket and engaged with the butt end of said blade shank, means for positioning and securing said control element to said shank, said shank having splines formed internally thereof, and said positioning and securing means comprising a bushing engaging said splines, means to secure said bushing in said shank, means on said control element non-rotatably engaging said bushing, and a removable assembly securing said control element to said bushing against displacement along the blade axis.

MAURICE E. CUSHMAN.

REFERENCES CITED

The following references are of record in the file of this patent:

UNITED STATES PATENTS

| Number | Name | Date |
|---|---|---|
| Re. 15,345 | Robson | Apr. 25, 1922 |
| 1,514,871 | Sperry | Nov. 11, 1924 |
| 1,884,925 | Vanderbeck | Oct. 25, 1932 |
| 1,990,814 | Castro | Feb. 12, 1935 |
| 2,037,251 | Mansson | Apr. 14, 1936 |
| 2,045,174 | Barish | June 23, 1936 |
| 2,153,028 | Schanzer | Apr. 4, 1939 |
| 2,233,364 | Gemeny | Feb. 25, 1941 |
| 2,248,590 | Smith | July 8, 1941 |
| 2,268,948 | Lampton et al. | Jan. 6, 1942 |
| 2,270,542 | Martin et al. | Jan. 20, 1942 |
| 2,275,361 | Godfrey | Mar. 3, 1942 |
| 2,290,196 | Martin | July 21, 1942 |

FOREIGN PATENTS

| Number | Country | Date |
|---|---|---|
| 550,257 | Great Britain | Dec. 31, 1942 |